United States Patent [19]
Abdukarimov et al.

[11] Patent Number: 5,019,683
[45] Date of Patent: May 28, 1991

[54] ELECTROEROSIVE DRILLING OF HOLES WITH WORKING FLUID SYSTEM

[76] Inventors: Erkin T. Abdukarimov, Ts-1,52, kv. 6.; Khaidar A. Vakhidov, massiv Chilanzer 2 kvartal, 23, kv. 6., both of Tashkent, U.S.S.R.

[21] Appl. No.: 423,444
[22] PCT Filed: Jan. 27, 1988
[86] PCT No.: PCT/SU88/00024
  § 371 Date: Sep. 26, 1989
  § 102(e) Date: Sep. 26, 1989
[87] PCT Pub. No.: WO89/07028
  PCT Pub. Date: Aug. 10, 1989
[51] Int. Cl.[5] .............................................. B23H 7/30
[52] U.S. Cl. ............................ 219/69.2; 204/224 M; 219/69.14; 219/69.16
[58] Field of Search ............... 219/69.14, 69.15, 69.16, 219/69.2; 204/129.1, 129.2, 129.25, 129.5, 129.7, 129.75, 224 M

[56] References Cited

U.S. PATENT DOCUMENTS

| | | | |
|---|---|---|---|
| 3,271,283 | 9/1966 | Clifford et al. | 204/224 M |
| 3,318,793 | 5/1967 | Webb | 219/69.16 |
| 3,668,105 | 6/1972 | Abt | 204/224 M |
| 4,543,460 | 9/1985 | Inoue | 219/69.14 |

FOREIGN PATENT DOCUMENTS

| | | |
|---|---|---|
| 657946 | 4/1979 | U.S.S.R. . |
| 992392 | 5/1965 | United Kingdom . |
| 1505065 | 3/1978 | United Kingdom . |

OTHER PUBLICATIONS

"Metallorezhuschie stanki" edited by V. K. Tepinkichiev, c.f. p. 287, Fig. 240, 12/1973.

Primary Examiner—Geoffrey S. Evans
Attorney, Agent, or Firm—Lilling and Lilling

[57] ABSTRACT

An apparatus for electroerosive piercing of holes in workpieces having an electrode tool in the form of a rod placed with a clearance in a shell and projecting therefrom, a device for feeding and rotating the rod mechanically connected to a device for reciprocating the shell relative to the rod. The device for reciprocating the shell relative to the rod is fashioned as a hydraulic cylinder, a piston of which has the shell rigidly secured thereto at the side of the workpiece, and at least one cavity of the hydrauylic cylinder is connected to a system for feeding and discharging a working fluid, the piston having at least one passage communicable with the interior of the shell of the electrode tool and wherethrough the rod of the electrode tool extends with a clearance.

5 Claims, 4 Drawing Sheets

ELECTROEROSIVE DRILLING OF HOLES WITH WORKING FLUID SYSTEM

BACKGROUND OF THE INVENTION

1. Field of the Invention

This invention relates generally to electroerosive machining of metals, and more particularly to an apparatus for electroerosive piercing of holes in workpieces.

2. Description of the Related Art

There is known an apparatus for electroerosive piercing of holes in workpices (cf., PCT/SU 87/00099, filed Sept. 17, 1987). This prior art apparatus comprises an electrode holder with an electrode tool in the form of a rod placed with a clearance in a shell and projecting therefrom, and a means for moving, locking and wear-compensation of the electrode tool. This means includes parallel operatively interconnected driving and driven carriages each having a clamp for successively rigidly locking the rod of the electrode tool fashioned as movable and stationary jaws, the casing of each such carriage having through centering holes at the level of a clearance between the movable and stationary jaws, these holes being arranged coaxially with a passage provided in a pipe butt affixed to the lower part of the electrode holder. This passage receives, for axial displacements therein, the rod of the electrode tool the shell of which is rigidly secured to the pipe butt of the electrode holder coaxially with the rod, the electrode holder being fixedly attached to the driving carriage. The electrode holder can be hollow inside, and the interior of the electrode holder should preferably communicate with the passage receiving the rod of the electrode tool providing for the feed of a working fluid through the clearance between the shell and the rod of the electrode tool to the machining zone.

In the course of electroerosive machining, the driving carriage with the shell of the electrode tool secured thereon can move relative to the rod of the electrode tool mounted on the driven carriage in a direction opposite to the feed of the electrode tool to thereby compensate for part of the rod of the electrode tool being consumed during the electroerosive process.

However, this construction of the electroerosive apparatus including a feed drive, and driving and driven carriages carrying an electrode tool can find application only in stationary units, and therefore fails to pierce holes in large-size workpieces and in difficultly accessible locations.

SUMMARY OF THE INVENTION

It is therefore an object of the present invention to provide an apparatus for piercing of holes in workpieces, in which a means for reciprocating a shell relative to a rod of an electrode tool would be so constructed as to enable piercing deep holes in large-size workpieces and difficultly accessible locations, as well as to ensure a higher accuracy and surface finish of holes, and more efficient operation of the apparatus.

The aims of the invention are attained by an apparatus for electroerosive piercing of holes in workpieces comprising an electrode tool in the form of a rod placed with a clearance in a shell to project therefrom, and a means for feeding and rotating the rod, which according to the invention, is provided with a means for reciprocating the shell relative to the rod mechanically connected to the means for feeding and rotating the rod and having the form of a hydraulic cylinder having cavities, and a piston which has the shell secured thereto at the side of the workpiece, and at least one of the cavities of the hydraulic cylinder is connected to a line for feeding and discharging a working fluid, the piston having at least one passage which communicates with the interior of the shell of the electrode tool and through which the rod of the electrode tool extends with a clearance.

In order to monitor the movement of the shell in the course of electroerosive piercing, it is desirable that at least one magnetic element of a ferromagnetic material be accommodated at the piston of the hydraulic cylinder, the outer surface of the hydraulic cylinder being provided at the level of the magnetic element with an indicator ring of a magnetizable material capable of reciprocations.

Such an arrangement of the means for reciprocating the shell in the proposed apparatus makes it possible to use the same working fluid both as a working body which moves the piston of the hydraulic cylinder with shell of the electrode tool to this or that side relative to the rod of the electrode tool to compensate for the consumable part thereof during electroerosive machining, and as a working medium necessary for carrying out the process of electroerosion.

In order to ensure a more stable positioning of the apparatus on the workpiece, it is preferable to provide, between the end of the hydraulic cylinder and the workpiece, a thrust journal with a centering sleeve having a stepped opening tightly fitted therein at the point where the electrode tool extends through the thrust journal, the step of smaller diameter of the opening serving to center the electrode tool, whereas the step of larger diameter of the opening defines, with the electrode tool, an annular clearance communicating with a discharge pipe, the bottom of the thrust journal having a sealing ring, whereas at the point where the electrode tool projects from the thrust journal there is provided an annular recess of a diameter greater than the outside diameter of the centering sleeve, the interior of this annular recess being communicated with the annular clearance of the centering sleeve to ensure evacuation of the working medium containing the products of electroerosion from the machining zone.

In some instances it is preferable that a spring element be provided at least in one of said cavities of the hydraulic cylinder to ensure reciprocation of the piston.

The apparatus according to the invention can make deep holes in any current-conducting materials, in large-size workpieces, and in difficultly accessible locations. Holes are made efficiently with high accuracy and surface finish.

BRIEF DESCRIPTION OF THE DRAWINGS

The invention will now be described in greater detail with reference to various specific embodiments thereof taken in conjunction with the accompanying drawings, in which.

DESCRIPTION OF THE PREFERRED EMBODIMENTS

Figure 1:
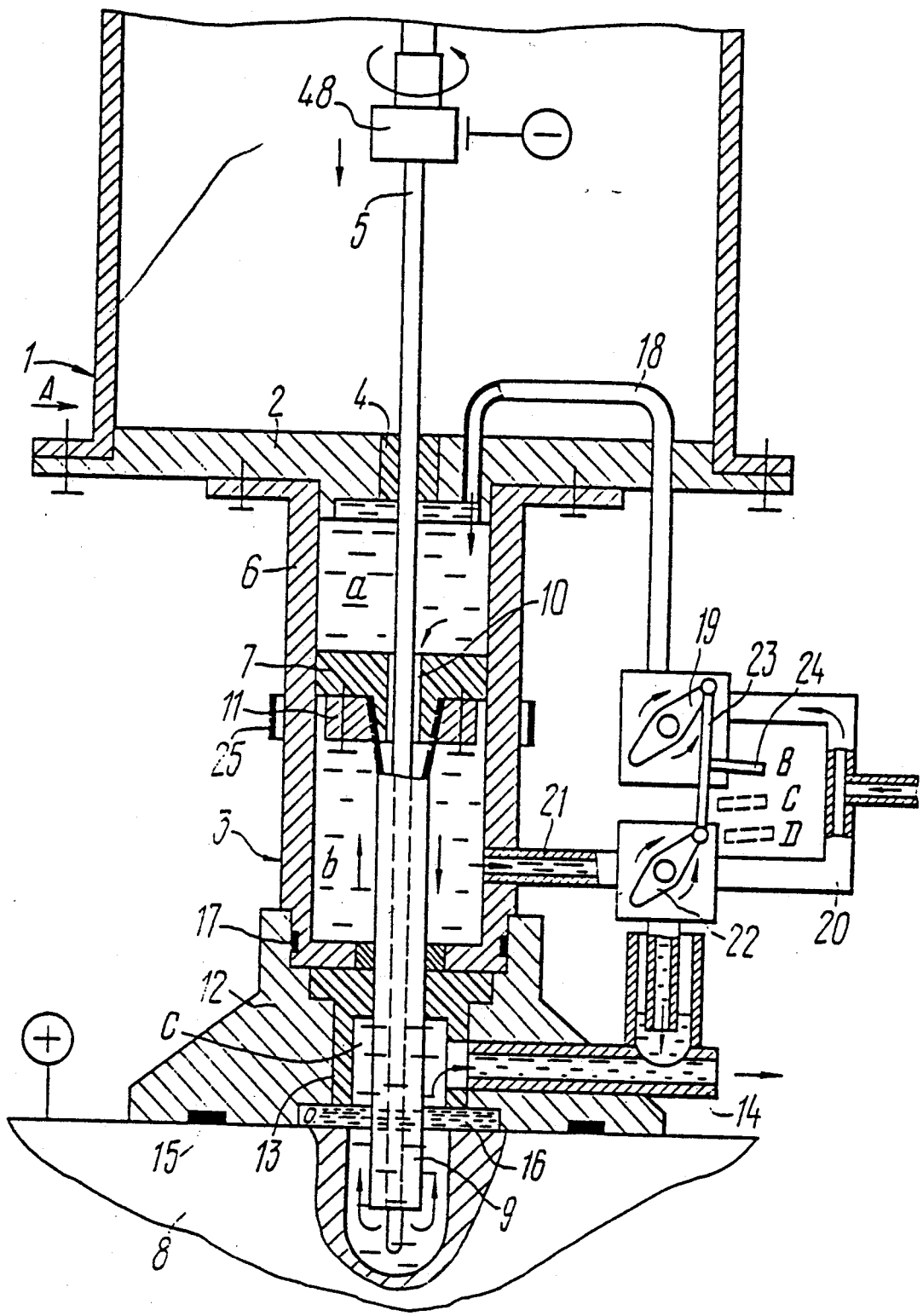
FIG. 1 is a general view of an apparatus for electroerosive piercing of holes in workpieces according to the invention.

An apparatus for electroerosive piercing of holes in workpieces embodying the present invention comprises a means 1 (FIG. 1) for feeding and rotating a rod mechanically connected through a flange 2 to a means 3 for reciprocating a shell relative to the rod. Press-fitted to the flange 2 is a dielectric sealing sleeve 4 wherethrough the rod 5 of the electrode tool extends. The means 3 for reciprocating the shell relative to the rod of the electrode tool has the form of a hydraulic cylinder 6 the interior of which is divided by a piston 7 into cavities "a" and "b", whereas the shell 9 of the electrode tool is rigidly secured to the piston 7 at the side of the workpiece 8. The piston 7 has a passage 10 which communicates with the interior of the shell 9 of the electrode tool and through which the rod 5 of the electrode tool extends with a clearance. The rod 5 of the electrode tool is received by the shell 9 with a clearance to project therefrom during machining the workpiece 8. The shell 9 is secured on the piston 7 by a magnetic element 11, in this case a magnetic sleeve fabricated from a ferromagnetic material, and connected to the piston 7 by screws. The magnetic elements can be fashioned as small cylinders mounted at the periphery of the piston 7, the shell 9 in this case being affixed to the piston 7 by any known suitable means.

Provided between the end of the hydraulic cylinder 6 and workpiece 8 is a thrust journal 12 provided with a centering sleeve 13 mounted at the point where the electrode tool extends therethrough and having a stepped opening, the step of smaller diameter serving for centering the electrode tool, whereas the step of larger diameter forming an annular clearance with the shell 9 of the electrode tool communicating with a drain pipe 14. A sealing ring 15 is provided at the bottom of the thrust journal 12, whereas at the point where the electrode tool projects from the thrust journal 12 there is provided a round recess 16 of a diameter greater than the outer diameter of the centering sleeve 13. A cavity "c" of the annular recess 16 communicates with the annular clearance of the centering sleeve 13, and ensures evacuation of the working medium containing products of the electroerosive process from the machining zone of the workpiece 8. Hermeticity at the point of abutment between the hydraulic cylinder 6 and thrust journal 12 is ensured by a sealing ring 17. Movement of the piston 7 of the hydraulic cylinder 6 with shell 9 is executed by a system for feeding and discharging the working medium including a pipe 18 communicating the cavity "a" of the hydraulic cylinder 6 through a valve 19 with a a pipe 20 which feeds the working fluid, and a pipe 21 communicating the cavity "b" with the drain pipe 14 and pipe 20 through a valve 22. Movement of the shell 9 with the piston 7 of the hydraulic cylinder 6 is controlled by a link element 23 pivotably connected to handles of the valves 19 and 22 by applying pressure to a lever 24 rigidly affixed to the link element 23.

Provided at the outer surface of the hydraulic cylinder 6 is an indicator ring 25 of a magnetic material capable of reciprocations under the action of a magnetic field generated by the magnetic sleeve secured on the piston 7.

Figure 2:
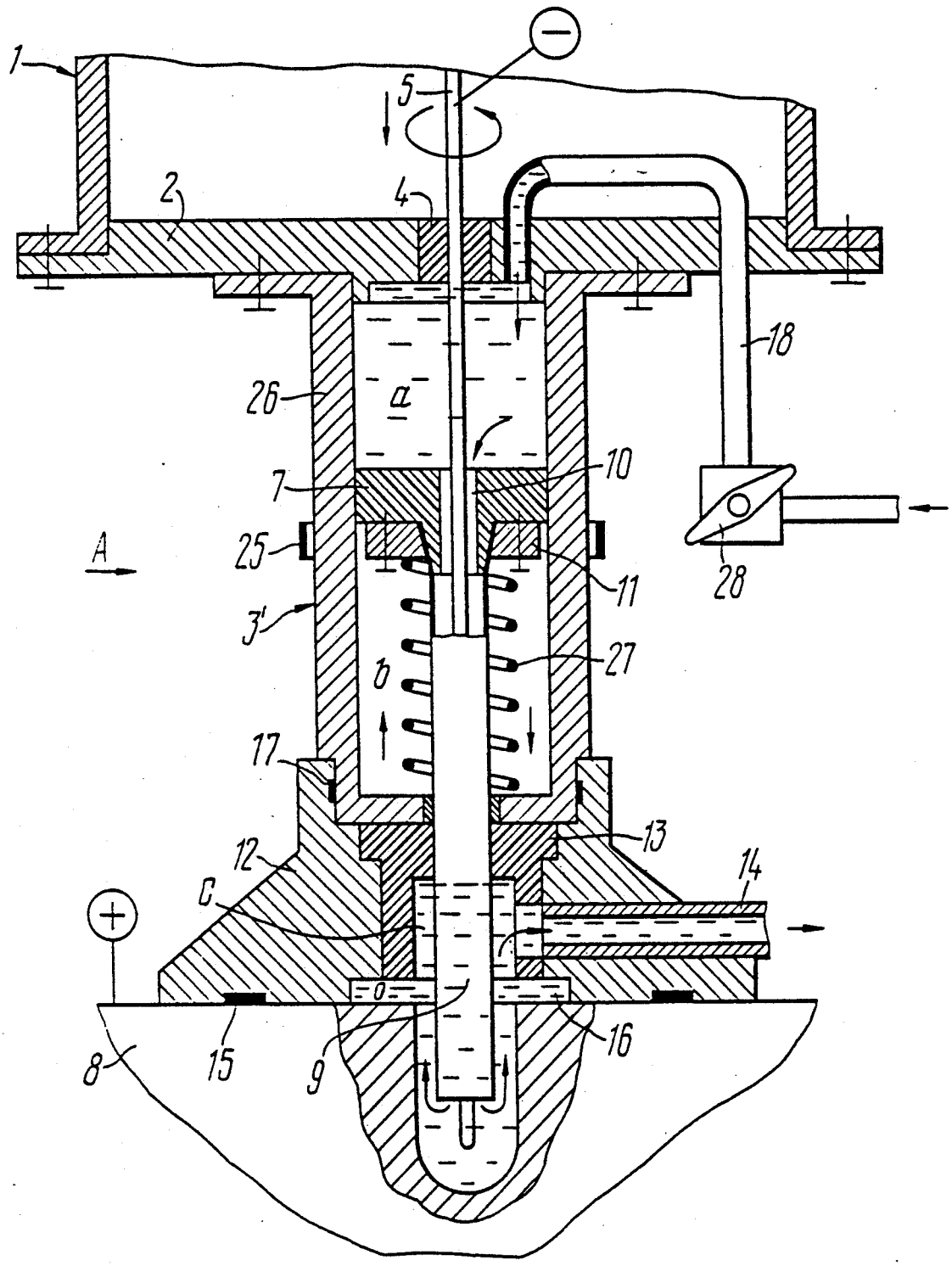
FIG. 2 is an embodiment of a means for reciprocating a shell relative to the rod of an electrode tool.

With reference to FIG. 2, there is shown an alternative modification of means 3' for reciprocating the shell having a single-side action hydraulic cylinder 26 in which the cavity "b" accommodates a spring 27 bearing by one end thereof on the end wall of the cavity of the hydraulic cylinder 26 and by the outer end on the piston 7. The electrode tool extends through the spring 27. In this instance the cavity "b" does not receive the working fluid, whereas the working fluid is forced to the cavity "a" through a valve having a handle 28, and pipe 18. Otherwise, the means 3' for reciprocating the shell is similar to the construction represented in FIG. 1. The working fluid containing the products of electroerosion process is discharged through the drain pipe 14.

The means 1 for feeding and rotating the rod is of any known construction suitable for the purpose and ensuring feeding and rotation of the rod 5 of the electrode tool.

Figure 3:
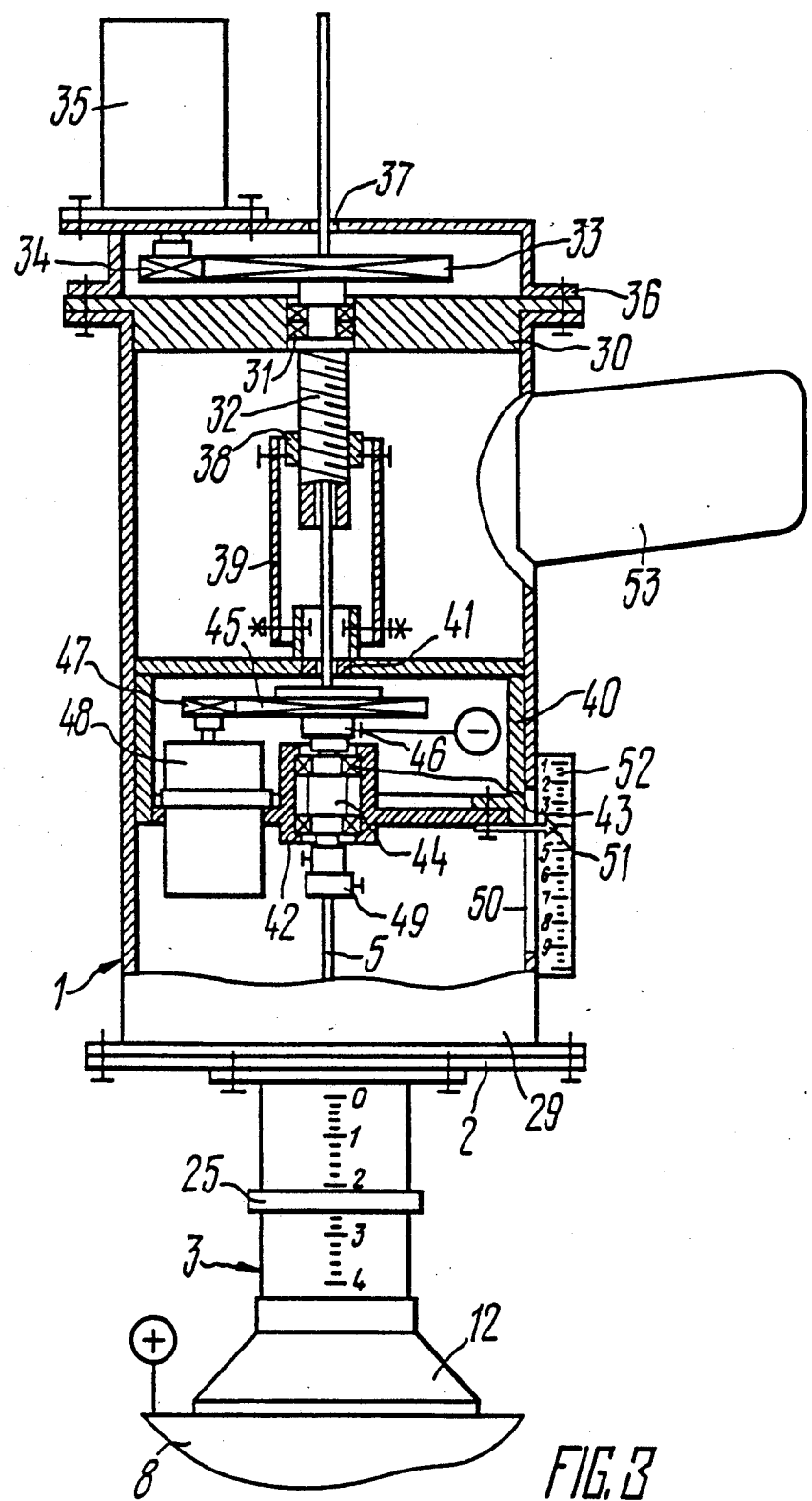
FIG. 3 is a modified form of an apparatus for electroerosive piercing of holes in workpieces (a view taken along the arrow A in FIGS. 1 and 2)

Referring now to FIG. 3, there is shown one more alternative arrangement of the means 1 for feeding and rotating the rod including a casing 29 the lower end of which is attached by the flange 2 to the means 3 for reciprocating the shell. Mounted in a cover plate 30 of the casing 29 in rolling bearings 31 is a lead screw 32 having a through hole, one end of the screw having a toothed wheel 33 rigidly secured thereto and mating with a gear 34 mounted on a shaft of an electric motor 35 of the drive for feeding the rod of the electrode tool secured on the casing 29 by a bracket 36 having a dielectric sleeve 37 arranged coaxially with the lead screw 32. Provided inside the casing 29 on the threads of the lead screw 32 is a nut 38 pivotably connected through a sleeve 39 to a slide 40 having a dielectric sleeve 41 arranged coaxially with the lead screw 32. The slide 40 has a flange 42 of a dielectric material rigidly affixed thereto. The hub portion of the flange 42 has a shaft 44 mounted thereon coaxially with the lead screw 32 on rolling bearings 43, this shaft 44 being provided with a through passage in its interior. One end of the shaft 44 accommodated inside the slide 40 has a toothed wheel 45. Tightly fitted between the hub of the flange 42 and toothed wheel 45 on the shaft 44 is a contact ring 46 to which a voltage of a potential opposite in sign to the potential of the workpiece 8 is applied from a power source (not shown). The toothed wheel 45 is in engagement with a gear 47 of an electric motor 48 of the drive for rotating the rod of the electrode tool secured on the flange 42.

A collet 49 is tightly fitted on the opposite end of the shaft 45. The rod 5 of the electrode tool extends through the dielectric sleeve of the bracket 36, through hole of the lead screw 32, dielectric sleeve 41 of the slide 40, and through the passage of the shaft 44; the collet 49 ensures a reliable electrical contact and locking of the rod 5 of the electrode tool on the shaft 44.

For determining the depth of a hole pierced in the workpiece 8 the casing 29 has a slot 50 of a length corresponding to the maximum feed travel of rod 5 of the electrode tool. The slide 40 accommodates a pointer 51 indicating the depth of hole being pierced and movable in the slot 50 along a replaceable scale 52 secured on the casing 29 lengthwise of the slot 50. The scale is calibrated so as to make for consumption of the rod 5 of the electrode tool depending on the material of the workpiece 8, material of the rod 5 of the electrode tool, diameter of the rod 5, diameter of the hole being machined, and other parameters associated with piercing holes in the workpiece 8. For ease of holding the apparatus on the workpiece 8 in the working position there is provided a handle 53 with control buttons.

The proposed apparatus for electroerosive piercing of holes in workpieces operates as follows. Prior to operation it is necessary to run the rod 5 (FIG. 1) of the electrode tool through the sleeve 4 so that the electrode tool would not project away from the bearing plane of the thrust journal 12. Then by using, for example, a screw driver, the rod 5 of the electrode tool is reliably secured in the collet 49 (FIG. 3) through a special port provided in the casing 29 of the means 1 for feeding and rotating the rod. Therewith, the piston 7 must rest together with the ring 25 at the top position, whereas the shell 9 with the rod 5 must not project from the bearing surface of the thrust journal 12. In this position the apparatus is placed on the workpiece 8 to be machined. Thereafter, the lever 24 is shifted from position B to position C, whereby the working fluid is conveyed to the cavities "a" and "b" of the hydraulic cylinder 6 simultaneously through the pipes 20, 18 and 21, respectively. The discharge passage from the cavity "b" is closed. The working fluid flows to the interior of the shell 9 and is evacuated outside through the drain pipe 14. This is followed by energization of the drive for rotating the electrode tool (electric motor 48, FIG. 3) the gear 47 of which rotates the shaft 4 through the toothed wheel 45. The shaft 44 causes rotation of the collet 49 with the rod 5 of the electode tool. After this the drive (electric motor 35) of the rod 5 of the electrode tool is energized. Rotation is transmitted from the gear 34 through the toothed wheel 33 to the screw 32 journalled in the bearings 31. While rotating in the bearings 31, the screw 32 moves the nut 38 toward the workpiece 8 being machined, whereas the nut 38 acting in turn on the sleeve 39 moves the slide 40 with the rotating rod 5 of the electrode tool to the same side providing projection of the working end of the rod 5 of the electrode tool from the shell 9 to a required length. Feeding of the rod 5 is accompanied by application of a voltage thereto through brushes, contact ring 46, shaft 44 and collet 49 (the power source not shown). Upon attaining a given interelectrode gap a spark jumps, whereby the electroerosive process is initiated. During piercing of the hole the working fluid flows through the shell 9 of the electrode tool (FIG. 1), cavity made by the hole in the workpiece 8, and is conveyed through the annular recess 16 to the cavity "c", wherefrom it flows to the drain pipe 14. Such a system of feeding the working fluid ensures continuous evacuation of the products of erosion from the interelectrode gap. As the rod 5 of the electrode tool is driven deeper into the hole being made in the workpiece, it becomes necessary to feed the shell 9 of the electrode tool (FIG. 1) with the aim of maintaining the required length of projection of the rod 5 from the shell 9 (i.e., the distance between the edge of the shell 9 and the end of the rod 5 of the electrode tool projecting therefrom). This is done by shifting the lever 24 from the position C to the position B to close the admission of the working fluid to the cavity "b" and connect it to the drain pipe 14. Since the working fluid continues to enter the cavity "a" through the pipe 18, the piston 7 with shell 9 start to move toward the workpiece 8. The travel of the shell 9 is monitored by the reading of the scale 52 (FIG. 3) for feeding the rod 5 of the electrode tool. Movement of the piston 7 (FIG. 1) is monitored by the ring 25, which moves therewith under the action of magnetic field produced by the magnetic element 11, such as a a sleeve secured on the piston 7.

Movement of the shell 9 of the electrode tool by the hydraulic cylinder 26 (FIG. 2) is ensured by turning the handle 28 of the valve. Therewith, depending on the direction in which the handle 28 of the valve is turned, the working fluid is conveyed either to the cavity "a" to move the piston 7 with shell 9 of the electrode tool toward the workpiece and compress the spring 27, or the feed of the working fluid is stopped, the spring 27 is straightened to return the piston 7 with the shell 9 to the initial position. In all instances the working fluid continues to enter the interior of the shell 9 of the electrode tool. Movement and stops of the piston 7 (FIGS. 1 and 2) with shell 9 are caused by increasing or reducing the pressure of working fluid in the cavity "a" thanks to a higher or lower rate of flow of the working fluid through the valve having the handle 28.

In order to accurately determine the travel path of the piston 7 with shell 9, a scale is calibrated at the wall of the hydraulic cylinder 6 (FIG. 3) along which the indicator ring 25 moves. The piston 7 (FIG. 1) with shell 9 are stopped by shifting the lever 24 to the position C. In this position of the lever 24 the cavity "b" containing the working fluid is closed, and the fluid is admitted through the pipe 18 to the cavity "a", whereby an equal pressure is produced at both sides of the piston 7 causing it to stop.

Upon terminating operation the electrode tool is deenergized. Shifting the lever 24 to the position D blocks the cavity "a" of the hydraulic cylinder 6, and the working fluid is admitted to the cavities "b" through the pipe 21. A pressure developed in the cavity "b" moves the piston with shell 9 to move toward the cavity "a", whereby the working fluid is forced to the clearance between the shell 9 and rod 5 of the electrode tool, after which the working fluid flows through the cavity "c" to the drain pipe 14. The shell 9 is drawn in until the edge of the shell 9 is flush with the bearing surface of the thrust journal 12 (when the movement of the shell 9 to the side opposite to the feed of the rod 5 of the electrode tool is necessitated during operation of the apparatus, use is made of a provision for drawing in the shell 9 of the electrode tool to the interior of the hydraulic cylinder 6). Then the drive for feeding the rod 5 of the electrode tool is actuated in a reverse direction, and, the rod 5 of the electrode tool is caused to be drawn in. As soon as the tip of the rod is flush with the bearing surface of the thrust journal 12, the apparatus is completely deenergized accompanied by terminating the feed of the working fluid.

The heretofore described apparatus is easy it's operate thanks to small overall dimensions and weight, which allows to use as a portable hand-operated device (of the electric drill type). It can pierce high-quality holes in large-size workpieces and in difficultly accessible locations with high efficiency.

Small size, safety, and simplicity in operation do not require high skill on the part of the operator.

Figure 4:
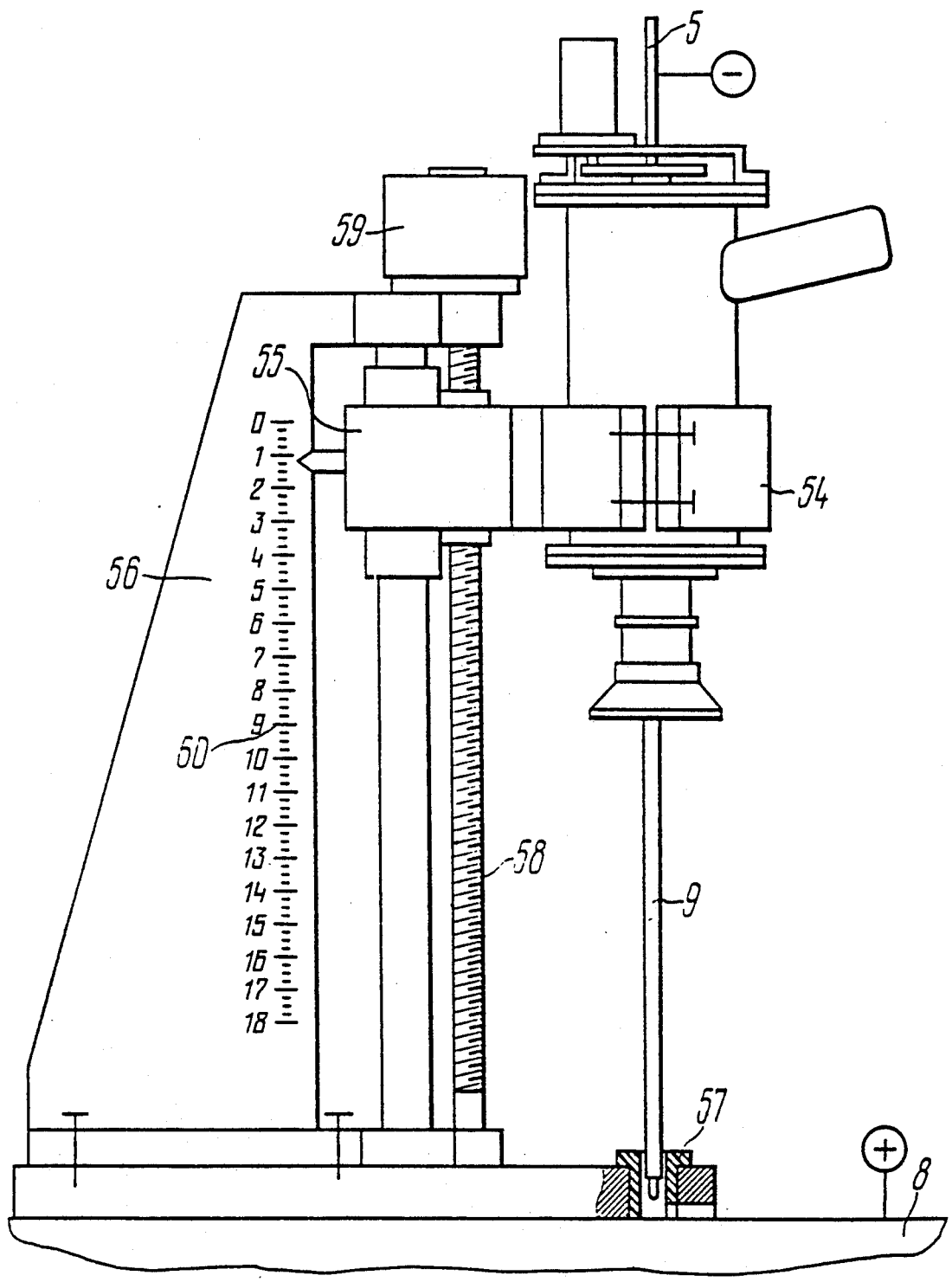
FIG. 4 is a modified form of the proposed apparatus for use as an attachment to a stationary unit.

Referring now to FIG. 4, the proposed apparatus for piercing extra deep holes or for making holes with high surface accuracy can be mounted on a stationary unit. The apparatus in this case has the form of an attachment secured by a half-clamp 54 in pair with a bracket 55 to the stationary unit 56, whereas the rod 5 with shell 9 of the electrode tool is centered by a conductor sleeve 57 on the workpiece 8. The half-clamp 54 mechanically connects the apparatus to a lead screw 58. The lead screw 58 is moved by a feed drive 59. The frame of the unit has a scale 60 to indicate the feed travel of the apparatus. The length of the projecting portion of the shell 9 must correspond to the depth of the hole to be pierced. Prior to starting operation the apparatus rests in the extreme top position, and the end of the shell 9 with rod 5 is inserted in the conductor 57. Electric current is first applied to the electrode tool, and the working fluid is fed to the shell 9. Then, after energization of the drive for rotating the rod 5 of the electrode tool, the drive 59 for feeding the apparatus is actuated, which rotates the lead screw 58 and moves the bracket 55 with the apparatus downwards along guides. As soon as the interelectrode gap reaches the required magnitude, electroerosion process is initiated. As the hole is pierced deeper, the rod 5 of the electrode tool is fed to compensate for the consumable part of the rod 5 of the electrode tool, thereby maintaining projection of the tip of the rod 5 from the edge of the shell necessary for carrying out the electroerosive process. The depth of hole being pierced is monitored by the position of the pointer at the scale 60 on the frame of the unit. The lead screw 58 allows raising or lowering of the apparatus.

The proposed apparatus can find application in machine building industry and machine tool manufacture, as well as in metal working and erection operations (e.g., in shipbuilding, aircraft construction, and space technology) for electroerosive piercing of deep holes in current-conducting materials, in large-size workpieces, and in hard-to-reach locations.

We claim:

1. An apparatus for electroerosive piercing of holes in workpieces, comprising: an electrode tool in the form of a rod placed with a clearance in a shell and projecting therefrom, and means for feeding and rotating the rod, a means for reciprocating the shell relative to the rod mechanically connected to said means for feeding and rotating the rod and having the form of a hydraulic cylinder having cavities, and a piston to which said shell is rigidly secured at the side of a workpiece, at least one of said cavities of said hydraulic cylinder being connected to a system for feeding and discharging a working fluid, said piston having at least one passage communicating with an interior of said shell of the electrode tool, the rod extending, with a clearance, through said passage.

2. An apparatus as claimed in claim 1, wherein the piston of the hydraulic cylinder accommodates at least one magnetic element of a ferromagnetic material, whereas provided at an outer surface of the hydraulic cylinder at a level corresponding to said magnetic element is an indicator ring of a magnetizable material capable of reciprocations.

3. An apparatus as claimed in claims 1 or 2, wherein, provided between an end of said hydraulic cylinder and said workpiece is a thrust journal having a centering sleeve with a stepped opening secured therein at a point where said electrode tool extends therethrough, a step of said opening of smaller diameter serving to center said electrode tool, whereas a step of said opening of larger diameter defining an annular clearance with said electrode tool is communicable with a drain pipe, a bottom part of said thrust journal having a sealing ring, whereas at a point where said electrode tool projects from said thrust journal there is provided an annular recess of a diameter greater than an outside diameter of said centering sleeve, the interior or said recess communicating with said annular clearance of said centering sleeve ensuring discharge of the working fluid with products of electroerosive process from a machining zone of the workpiece.

4. An apparatus as claimed in claims 1 or 2 wherein at least one of said cavities of said hydraulic cylinder accommodates a spring element ensuring reciprocations of said piston.

5. An apparatus as claimed in claim 3, wherein at least one of said cavities of said hydraulic cylinder accomodates a spring element ensuring reciprocations of said piston.

* * * * *